UNITED STATES PATENT OFFICE.

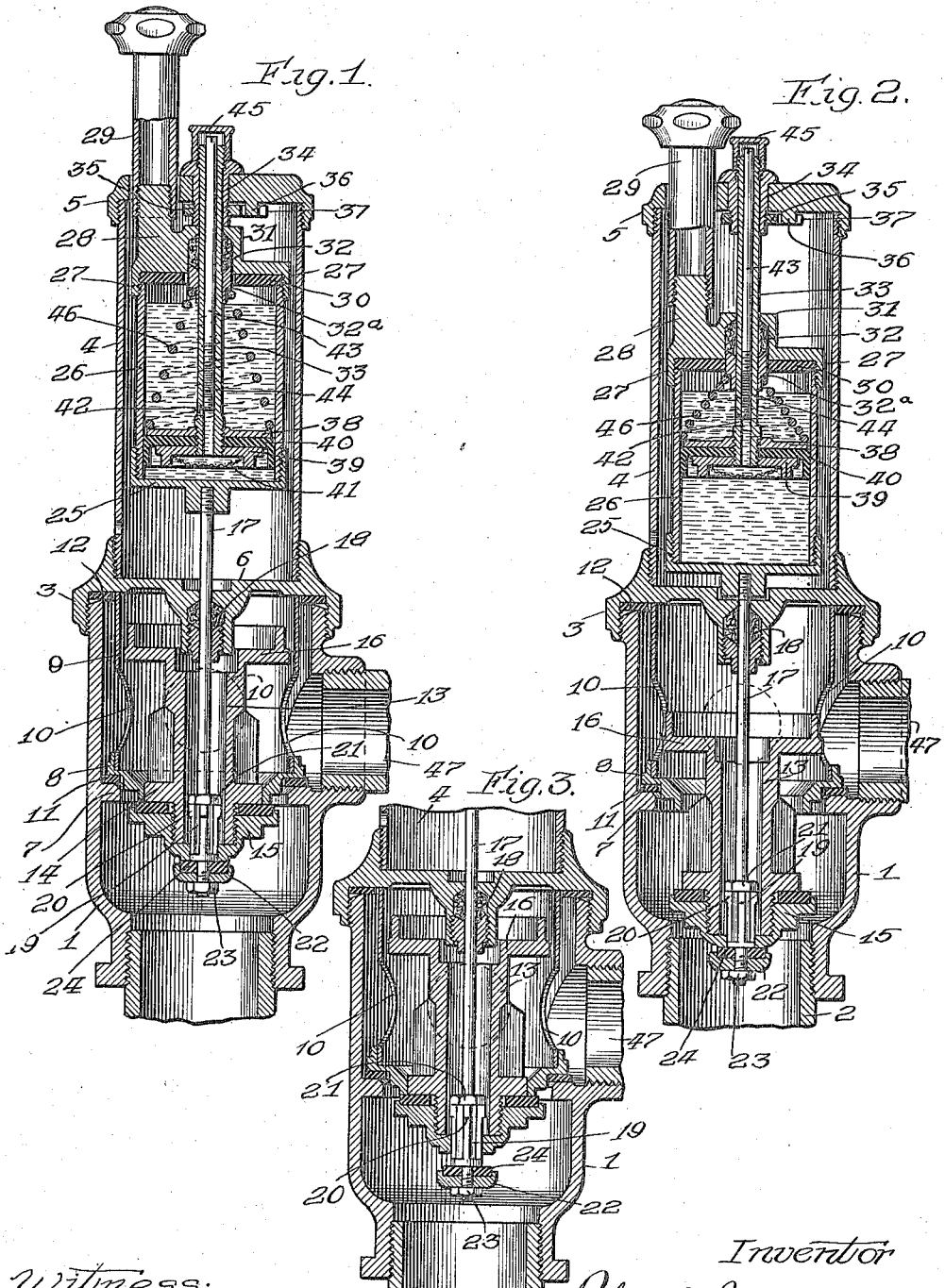

ROBERT A. BROOKS, OF CHICAGO, ILLINOIS, ASSIGNOR TO THE BROOKS MANUFACTURING COMPANY, OF CHICAGO, ILLINOIS, A CORPORATION OF ARIZONA.

FLUSHING-VALVE.

1,273,140.        Specification of Letters Patent.        Patented July 23, 1918.

Application filed September 15, 1915. Serial No. 50,734.

*To all whom it may concern:*

Be it known that I, ROBERT A. BROOKS, a citizen of the United States, residing at Chicago, in the county of Cook and State of Illinois, have invented certain new and useful Improvements in Flushing-Valves, of which the following is a specification.

My invention relates to slow-closing valves such as are used to flush waterclosets, in which the closing movement is automatically controlled and retarded by a completely inclosed and hermetically sealed body of oil or other similar liquid entirely inclosed and out of contact with the water channels of the device. It has for its object the production of a valve of this type which shall be simple and compact in construction, in which the oil chamber shall be packed and sealed completely and effectively, which shall have the mode of operation and the coaction and relationship of parts hereinafter described, and which shall be simple and durable, and reliable and perfect in action and operation. With these objects in view my invention consists in the combination of elements and particular association and correlation of parts hereinafter described, the essential elements of which are more particularly recited and pointed out in the appended claims.

Of the drawings, which illustrate a preferred and desirable embodiment of my invention, Figure 1 is a central vertical section showing the valve in normal, unoperated position; Fig. 2 a similar section, but showing both the main valve and relief valve in lowermost position; and Fig. 3 a fragmentary section in the same plane showing the valves at an intermediate position which occurs during their closing movements.

The same reference figures indicate the same parts on all the figures of the drawings.

The casing of my new and improved flushing valve comprises a lower member 1, adapted to be screwed upon the service pipe 2 and formed and arranged to inclose the valves hereinafter described, a coupling member 3, a supporting shell 4 which incloses the retarding mechanism, and a cap piece 5. It may be here generally explained that the operating stem of the device is rigidly connected with the cylinder of the retarding device, and the lower end of the cylinder in turn is rigidly connected with the stem of the relief valve, and that the depression of the operating stem and unseating of the relief valve causes the pressure on the main valve to be approximately equalized, so that the inlet valve may easily be opened under the combined influence of gravity and direct pressure communicated through the operating stem, the return movement of the parts to normal position being delayed by the retarding mechanism.

Proceeding to a more detailed description of the construction of my valve, the casing member 1, which may be termed the valve casing, is closed at the top by the coupling member 3 formed with a partition 6 equipped with a central stuffing box 18 of suitable construction, such as the well-known form illustrated, through which passes the stem of the relief valve. The valve chamber is formed with an internal flange 7 arranged to support a ring 8 in which is formed a valve seat for the main valve. Between the ring 8 and the partition 6 is interposed a cylindrical shell 9 provided around its lower end with openings 10, a packing ring 11, disposed between the flange 7 and ring 8, and a second packing ring 12, disposed between the valve casing 1 and coupling member 3, being provided to form impervious, secure joints.

The main valve of my device is formed with a hollow stem 13 which at the lower end carries the inlet valve proper, and at its upper end carries a disk of somewhat larger diameter than the inlet valve, and also having valvular functions. The inlet valve comprises a disk or circular block portion 14 near the lower end of the stem which is adapted to enter a corresponding opening in the ring 8, a seating member below such disk of suitable material to form an impervious closure when seated, and a clamping nut 15 screwed upon the lower end of the stem, the lower end of this nut being formed to constitute a valve seat for the relief valve. The upper end of the stem 13 carries a disk, in the present instance formed as a shallow cup 16, which fits within the shell 9 loosely, so that a limited flow of water past the valve is provided with partial reduction of pressure, while a sudden and approximately complete drop of pressure is not permittted until the disk passes below the top of the openings 10 in the shell.

The relief valve, carried by the lower end of the valve stem 17 passing through the stuffing box 18 in the partition 6, as before described, and centrally through the hollow stem of the main valve, is constructed to permit a slight relative movement with respect to such main valve. To this end a sleeve 19 flanged at its lower end and having vanes extending upwardly from such flange, the vanes being provided with shoulders 20, is interposed between an abutment nut 21 arranged a short distance above the end of the valve stem and a cupped nut 22 and locking nut 23 which are secured upon the end of such stem and serve to confine the valve disk 24 in place against the disk of the sleeve. In the present instance the nut 21, sleeve 19 and nuts 22 and 23 are all interiorly threaded and screwed tightly together on the end of the valve stem 17. The diameter of the valve seat opening in the clamping nut or ring 15 is less than that of the bore through the stem 13 of the main valve, and the shoulders 20 of the vanes project radially into position of interference with the internal ring or shoulder thus formed adjacent the relief valve seat. It is obvious that between this position of interference and the opposite position in which the relief valve is seated relative movement may take place.

Above the partition 6 and within a chamber inclosed by it and the shell 4 and cap 5 are arranged the cylinder and piston and associated parts of the retarding device. The cylinder may conveniently be formed as illustrated, of a bottom casting or head 25, having a depending central boss into which the stem 17 of the relief valve is threaded and an upwardly extending interiorly-threaded flange, a cylindrical shell 26 threaded in said flange, and an upper head 27 screw-threaded upon said shell. It will be understood that the cylinder is filled nearly full with a suitable liquid, that used in practice being a high-grade mineral oil which does not change in consistency under working conditions. The upper head 27 just mentioned, is formed with an upstanding exteriorly threaded boss 28 at one side, upon which is screwed the operating stem 29, such stem being equipped in the present instance with a push-button, though other operating means may be of course employed. Preferably the joint at the bottom of the cylinder is closed by a coating of solder, and a packing washer 30 interposed between the shell 26 and upper head 27 to seal it against leakage of the inclosed body of oil. The upper head is also formed with a central boss 31 in which is arranged a stuffing box 32 surrounding the upper part of a sleeve or hollow stem 33, to which stem is fixed the piston of the retarding device and which stem at its upper end is secured in fixed relation to the cap piece 5 of the case by means of a short flanged or headed nut or sleeve 34 screw-threaded thereon and confined in place on the cap piece by a plate or nut 35 which is screw-threaded upon the base of the hub. A lateral forked extension 36 of the plate 35 embraces between its branches a lug 37 projecting downwardly from the cap piece 5 to prevent rotation of the hub and stem within the bearing of the hub in said cap piece, this bearing being made somewhat loose fitting in order that the piston may adjust itself to slight irregularities of movement of the cylinder.

The piston of the retarding device in the present instance comprises an upper plate 38 and a lower plate 39, both screwed upon the hollow stem 33, and a cup leather 40 clamped between such plates. The lower plate 39 is preferably formed with a depending circular rib to provide ready means for securing a screen of wire gauze or other suitable strainer 41 over the lower end of the stem. Above the level of the upper plate 38 the interior of the hollow stem is in communication through a perforation 42 with the upper chamber of the cylinder. Above this perforation 42 the interior of the stem is screw-threaded and a long-threaded plug 43 the end of which may be shifted to more or less completely uncover or close the perforation 42 serves to restrict the passage of liquid therethrough according to the position to which it is adjusted. This plug is packed, above the level of the perforation, by a winding of fine fibrous material 44 which engages the complementary threads of the plug and stem, and effectively prevents leakage of liquid along such joint. The top of the plug 43 is slotted to enable it to be readily adjusted by means of a screw driver, and a cap 45, screwed upon the top of the stem 33, is provided to add a neat finish to the top.

The cylinder is yieldingly pressed upward by a conical, spirally coiled spring 46, the larger lower end of which bears upon the top of the piston disk 39 and the smaller end of which is seated against the gland 32ª of the stuffing box. Since this spring is always under compression the pressure exerted by it on the gland serves to constantly maintain pressure in the stuffing box and keep the joint tightly packed. Moreover, the conical shape of the spring is of advantage in permitting it to collapse more completely and into less space than would be possible in the case of a cylindrically coiled spring.

With the construction and arrangement of parts just described, it is evident that the cylinder and connected parts may easily be forced downwardly against the stress of the spring 46 by depressing the push button on the operating stem, the cup leather of the piston permitting the passage of oil from the upper to the lower side of the piston under the influence of pressure above the piston, but that the return of the cylinder and other parts to upper position under the influence of the spring will be retarded, since the oil cannot pass back past the cup leather but must pass through the restricted perforation or opening 42, at a speed governed by the adjustment of the plug 43.

The operation of my improved flushing valve will readily be understood from the foregoing description. Upon depression of the operating stem 29, the cylinder 26 and relief valve stem 17 will be forced downward and the relief valve unseated, the inlet valve for the moment remaining seated. Water under pressure will thereupon pass through the interior of the hollow stem 13 of the main valve and filling the chamber above the disk 16 exert pressure thereon nearly but not quite equalizing the pressure tending to keep the inlet valve seated, the balancing of pressure thus permitting the inlet valve to be carried downwardly off its seat under the influence of gravity and manual pressure exerted on the operating stem and communicated through contact of the shoulders 20 at the upper end of the vanes of the sleeve 19 of the relief valve with the lower contracted portion of the clamping ring 15 of the inlet valve. It is evident that as soon as the disk or block portion 14 of the inlet valve passes below the plane of the valve seat, which occurs somewhat before the disk 16 passes below the top of the openings 10, the pressure upon the bottom of the inlet valve will fall greatly, and the inlet valve will drop until it comes to rest upon the top of the relief valve, or until the force exerted by the upward flow of water balances its weight, the water in the meantime flowing freely around the inlet valve, through the openings 10, and out through the outlet pipe 47 to flush the closet bowl.

During the first part of the slow, upward movement of the relief valve to normal position the inlet valve will rest upon the relief valve and be carried upward with it, but as soon as the block portion 14 of the inlet valve enters and closes the opening at the valve seat, the increased pressure beneath such valve will immediately force it to its seat, against the lesser pressure on the top of the disk 16, thus lifting the inlet valve off the more slowly moving relief valve and opening a passage through the hollow stem 13 of the main valve. Water will flow through this channel during the remainder of the closing movement of the relief valve and will be forced around the edges of the loose fitting disk 16 to produce the "afterflow" necessary to refill the bottom of the closet bowl, which in the ordinary form of siphon closet with which my improved valve is adapted to be used will be completely emptied by the siphonic action of the main flush of water. This afterflow continues after the seating of the relief valve until all the water above the disk 16 has drained out and escaped through the drain pipe 47. It will be understood that the spring 46 is of such strength as to more than counter-balance the weight of the parts and the pressure which under any conditions could be exerted on the disk 16, so that the return of the valves to normal conditions is insured in any case.

Any sediment, such as sand, earth or other foreign matters contained in the water and which might tend to accumulate on top of the disk 16 were the openings 10 not provided, will be washed through such openings into the discharge passages of the valve when the main valve descends, and the parts are thus kept clean and all cutting and abrasive action on the edge of such disk, destroying its original adjustment with respect to the shell 9, is avoided.

I claim:

1. In a device of the character described and in combination with means for operating the hereinafter recited relief valve and automatic retarding means for closing such valve slowly, a main valve having a passage through its body and formed with a valve seat at the lower end of such passage and also having a block portion arranged to close the main valve opening in advance of the seating of the valve, a relief valve co-operating with said valve seat at the bottom of the passage through the main valve and arranged to carry said main valve toward its seat as said relief valve closes, said main valve having a relatively unretarded closing movement with respect to said relief valve, whereby said main valve will seat quickly in advance of the relief valve when the block portion of the main valve closes the main valve opening and a limited closing flow of water will occur through the relief valve.

2. A flushing valve mechanism comprising a valve casing formed with a partition which is provided with an inlet valve seat, a cylindrical shell within said casing having a closed upper end and with its lower end in communication with the discharge passages of the device, a main valve comprising an inlet valve at its lower end and a hollow stem and a disk loosely fitting in said cylindrical shell, said inlet valve being formed with a block portion arranged to close the inlet opening in advance of the seating of such valve and the lower end of the hollow stem of the valve being formed as a relief valve seat, a spring-pressed relief valve yieldingly tending to seat upon said last mentioned valve seat, said main valve having limited movement with respect to said relief valve, operating means for unseating said relief and main valves, and means for retarding the closing movement of the relief valve, said disk upon the main valve being arranged to exert a relatively slight retarding influence thereon, whereby said main valve will seat quickly in advance of the relief valve when the block portion of the main valve closes the main valve opening and a limited closing flow of water will occur through the relief valve.

3. In a device of the character described and in combination with means for operating the hereinafter recited relief valve and means for retarding the closing movement thereof, valve mechanism comprising a valve casing formed with a partition which is provided with an inlet valve seat, a tubular shell concentric with said seat having a closed upper end and at its lower end in open communication with the discharge passage of the device, a main valve having its lower end formed as an inlet valve arranged to coöperate with said inlet valve seat and having a hollow stem and a disk fitting loosely within said tubular shell, said inlet valve having a block portion arranged to close the inlet valve orifice in advance of the seating of such valve and being formed with a valve seat at the lower end of the bore through its stem, and a relief valve arranged to coöperate with said last mentioned valve seat, the said disk on the main valve being arranged to reduce the pressure thereabove to less than the pressure on the inlet valve and said main valve having a limited free relative movement with respect to the relief valve, whereby said main valve will seat quickly in advance of the relief valve when the block portion of such inlet valve closes the inlet valve orifice and a limited closing flow of water will be maintained into the upper end of the tubular shell.

ROBERT A. BROOKS.

Witnesses:
 Louis B. Erwins,
 Robert Dobberman.

Copies of this patent may be obtained for five cents each, by addressing the "Commissioner of Patents, Washington, D. C."